United States Patent
Eades et al.

(10) Patent No.: US 9,220,362 B2
(45) Date of Patent: Dec. 29, 2015

(54) SOUS-VIDE COOKER

(75) Inventors: Michael R. Eades, Incline Village, NV (US); Mary Dan Eades, Incline Village, NV (US); Daniel Eades, Santa Barbara, CA (US); Ted Eades, Dallas, TX (US); Robert D. Lamson, Seattle, WA (US); Richard Miles, London (GB); Anthony Nicholas Pond, London (GB)

(73) Assignee: Eades Appliance Technology, LLC, Incline Village, NV (US)

( * ) Notice: Subject to any disclaimer, the term of this patent is extended or adjusted under 35 U.S.C. 154(b) by 926 days.

(21) Appl. No.: 12/877,964

(22) Filed: Sep. 8, 2010

(65) Prior Publication Data

US 2011/0185915 A1    Aug. 4, 2011

Related U.S. Application Data

(60) Provisional application No. 61/272,279, filed on Sep. 8, 2009, provisional application No. 61/272,467, filed on Sep. 28, 2009.

(51) Int. Cl.
*A47J 27/00* (2006.01)
*A47J 37/12* (2006.01)
(Continued)

(52) U.S. Cl.
CPC ............... *A47J 27/004* (2013.01); *A47J 27/10* (2013.01); *A47J 27/18* (2013.01); *A47J 37/0611* (2013.01)

(58) Field of Classification Search
CPC ....... A47J 27/62; A47J 27/18; A47J 37/0611; A47J 37/0821; A47J 37/1219; A47J 37/1223; A47J 37/1295; A47J 36/20; A21B 5/08; A21C 13/00; A23L 3/365; A23N 4/04

USPC ........... 99/325, 330–333, 403, 407–410, 468, 99/483, 486
See application file for complete search history.

(56) References Cited

U.S. PATENT DOCUMENTS 1,947,055 A    2/1934   Moorman
2,156,216 A *  4/1939   James et al. ................ 219/474
(Continued)

FOREIGN PATENT DOCUMENTS

CN    1568875 A    1/2005
CN    2790361 Y    6/2006
(Continued)

OTHER PUBLICATIONS

PolyScience, Innovative Culinary Technology. e-Catalog. [online]. Large-vol. Sous Vide System. (not dated). [retrieved on Jan. 19, 2009]. Retrieved from the Internet: <URL: http://www.cuisinetechnology.com/Large-Volume.html>; p. 1 of 1.
(Continued)

*Primary Examiner* — Dana Ross
*Assistant Examiner* — Hemant Mathew
(74) *Attorney, Agent, or Firm* — Blank Rome LLP; Aldo Noto; Matthew J. Esserman

(57) ABSTRACT

A sous-vide cooker is disclosed. The sous-vide cooker comprises a cooking chamber, a heating system, and a housing that houses the cooking chamber and the heating system. The cooking chamber comprises a chamber body, a multi-function lid, a passive water circulator and, optionally, a rack for holding food items during the cooking process. The heating system comprises a heating unit, one or more temperature sensors, a proportional-integral-derivative (PID) controller, and a control panel. The PID controller is calibrated. The sous-vide cooker maintains a constant water temperature within tolerances.

20 Claims, 19 Drawing Sheets

(51) Int. Cl.
*A47J 27/62* (2006.01)
*A47J 37/06* (2006.01)
*A47J 27/10* (2006.01)
*A47J 27/18* (2006.01)

(56) References Cited

U.S. PATENT DOCUMENTS

| | | | |
|---|---|---|---|
| D236,677 S | 9/1975 | Pilger et al. | |
| 4,817,510 A * | 4/1989 | Kowalics et al. | 99/331 |
| D309,547 S | 7/1990 | Kane | |
| 5,097,759 A * | 3/1992 | Vilgrain et al. | 99/483 |
| 5,123,337 A * | 6/1992 | Vilgrain et al. | 99/483 |
| 5,203,257 A * | 4/1993 | Goad | 99/483 |
| 5,280,748 A * | 1/1994 | Pardo | 99/330 |
| 5,281,426 A * | 1/1994 | Pardo | 426/232 |
| 5,352,866 A * | 10/1994 | Cartwright et al. | 219/497 |
| D352,420 S | 11/1994 | Costello | |
| D360,804 S | 8/1995 | Hamada et al. | |
| 5,445,062 A * | 8/1995 | Polster | 99/348 |
| D369,505 S | 5/1996 | Philippe | |
| 5,596,514 A * | 1/1997 | Maher et al. | 700/306 |
| D400,404 S | 11/1998 | Indekeu | |
| D420,847 S | 2/2000 | Overfield | |
| 6,113,795 A * | 9/2000 | Subramaniam et al. | 210/651 |
| 6,171,630 B1 * | 1/2001 | Stanger et al. | 426/510 |
| 6,362,459 B1 * | 3/2002 | Schmidt | 219/414 |
| D484,697 S | 1/2004 | McCoy et al. | |
| D526,851 S | 8/2006 | Groff et al. | |
| D573,400 S | 7/2008 | Olson | |
| D603,210 S | 11/2009 | Davis | |
| D631,937 S | 2/2011 | Sykes | |
| 2008/0066624 A1 * | 3/2008 | Taylor et al. | 99/330 |

FOREIGN PATENT DOCUMENTS

| | | |
|---|---|---|
| EP | 1473554 B1 | 11/2004 |
| FR | 2638082 A1 | 4/1990 |
| WO | 2007/046762 A1 | 4/2007 |

OTHER PUBLICATIONS

PolyScience, Cuisine Technology. website. [online]. PolyScience Sous Vide and Culinary. (not dated). [retrieved on Jul. 21, 2008]. Retrieved from the Internet: <URL: http://stores.ebay.com/PolyScience-Sous-Vide-and-Culinary>; 2 pgs.
Techne. website. [online]. Science & Technology in the Kitchen, Sous-Vide Immersion Circulators, the Science of Taste. (not dated). [retrieved on Jul. 22, 2008]. Retrieved from the Internet: <URL: http://www.techneusa.com/sous_vide.htm>; 3 pgs.
PolyScience. catalog. Innovative Culinary Technology for Creative Chefs. (not dated); 8 pgs.
Julabo. catalog. Sous-Vide-Solutions, Culinary equipment for 'Sous-Vide' and 'Cook & Chill.' (not dated); 12 pgs.
Schwaner-Albright, Oliver; The Go-To Gadget Guy for Chefs. Food & Wine Jul. 2008: pp. 126-130.
Chu, Luisa, newsletter. [online]. "Viva Sous-Vide!" Chow. (not dated) [retrieved on Jul. 26, 2008]. Retrieved from the Internet: <URL: http://www.chow.com/stories/10145>; 5 pgs.
Chadzilla. blog. [online]. "sous-vide magic." Mar. 20, 2008. [retrieved on Aug. 26, 2008}. Retrieved from the Internet: <URL: http://chadzilla.typepad.com/chadzilla/2008/03/sous-vide-magic.html>; 4 pgs.
Operators Manual Standard Controller Models; PolyScience; Dec. 19, 2006; 56 pgs.
State Intellectual Property Office of China, Search Report, Application date—Sep. 8, 2010, 2 pgs.
Third Party Observation for Application No. EP14161371.1, Dec. 4, 2014, 3 pgs.

* cited by examiner

SOUS-VIDE COOKER

RELATED APPLICATIONS

This application claims the priority of U.S. Provisional Patent Application No. 61/272,279, filed on Sep. 8, 2009 and U.S. Provisional Patent Application No. 61/272,467, filed on Sep. 28, 2009, both of which are incorporated herein by reference in their entirety.

TECHNICAL FIELD

The technical field is cooking devices and, in particular, food cookers adapted for Sous-vide cooking.

BACKGROUND

Sous-vide is a method of cooking that is intended to maintain the integrity of food by heating the food for an extended period of time at a relatively low temperature. The food is cooked for a long time, sometimes over 24 hours. Unlike cooking in a slow cooker, sous-vide cooking uses airtight plastic bags placed in hot water at a temperature well below the water's boiling point (e.g., around 60° C. or 140° F.). Sous-vide cooking, however, often requires precise temperature control of the heated water. Differences of even one degree can affect the finished product. Consequently, commercially available Sous-vide cookers are expensive water-bath machines that use thermal immersion circulators to circulate precisely heated water. There exists a need for Sous-vide cookers that can be made at low cost and provide precise temperature control.

SUMMARY

A sous-vide cooker is disclosed. The sous-vide cooker comprises a cooking chamber, a heating system, and a housing that houses the cooking chamber and the heating system. The cooking chamber comprises a chamber body, a multi-function lid, a passive water circulator and, optionally, a rack for holding food items during the cooking process. The heating system comprises a heating unit, one or more temperature sensors, a proportional-integral-derivative (PID) controller, and a control panel.

In one embodiment, the multi-function lid comprises a flat top surface and skirts that join the top surface on its periphery and extend downward from the periphery so that the lid may be flipped over and serves as a draining tray. The lid may further contain two handles at the opposite sides of the lid to facilitate removal of the lid.

In another embodiment, the PID controller uses a temperature correction algorithm that converts temperatures measured by the one or more temperature sensors into actual water temperature in the cooking chamber based on an experimentally determined formula, so as to provide precise control of the cooking conditions.

In another embodiment, the housing contains two asymmetrically positioned side handles to aid emptying the cooking chamber. In a related embodiment, the cooking chamber also contains a draining outlet at the bottom of the chamber to aid emptying the cooking chamber. The housing further contains a window on a front wall to display the control panel. In one embodiment, the control panel is sloped inwardly at the top to facilitate operation by a user.

BRIEF DESCRIPTION OF DRAWINGS

The detailed description will refer to the following drawings in which.

DETAILED DESCRIPTION

Figure 1:
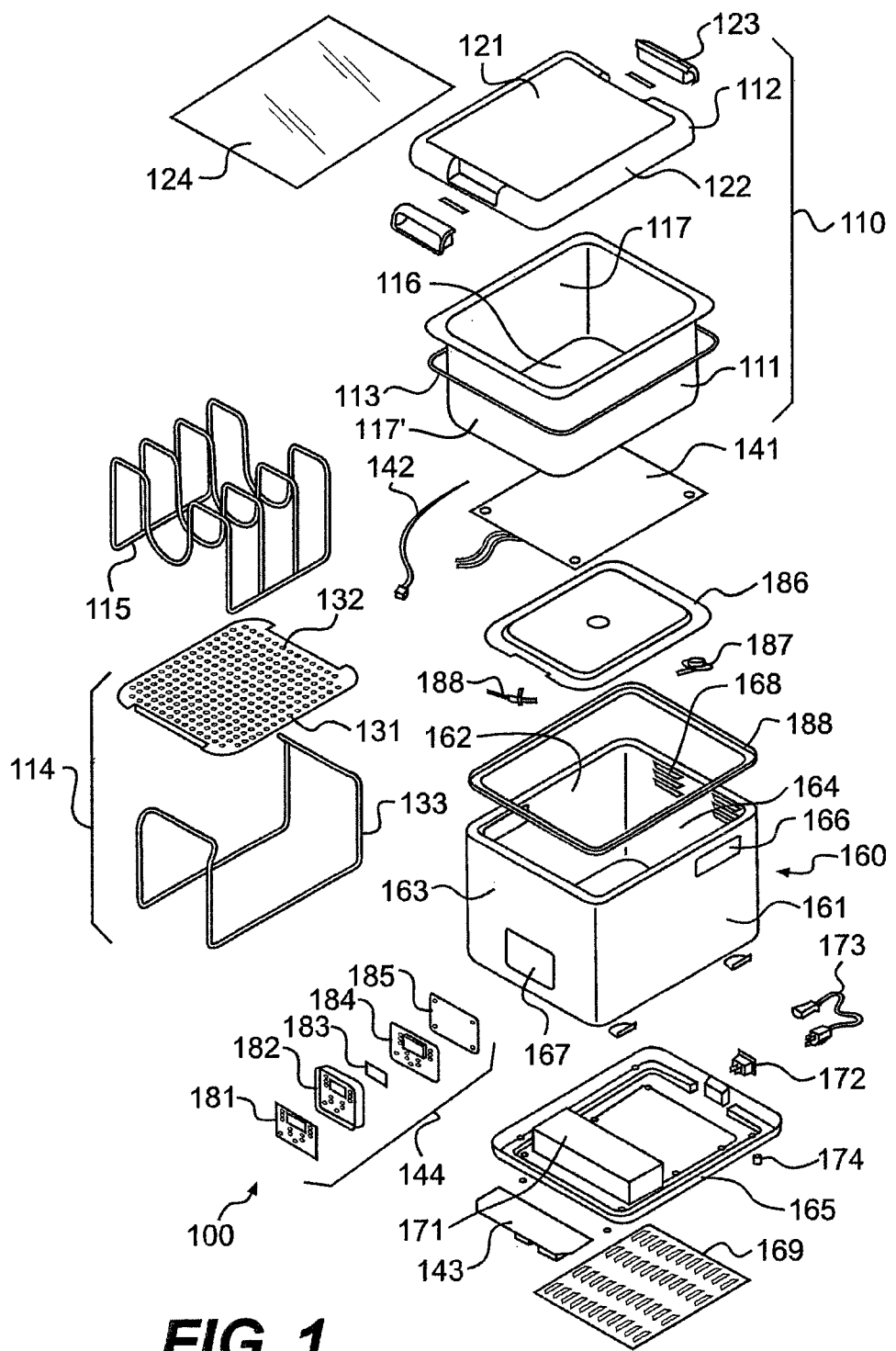
FIG. 1 is a schematic drawing showing components of a sous-vide cooker.
Figure 2A:
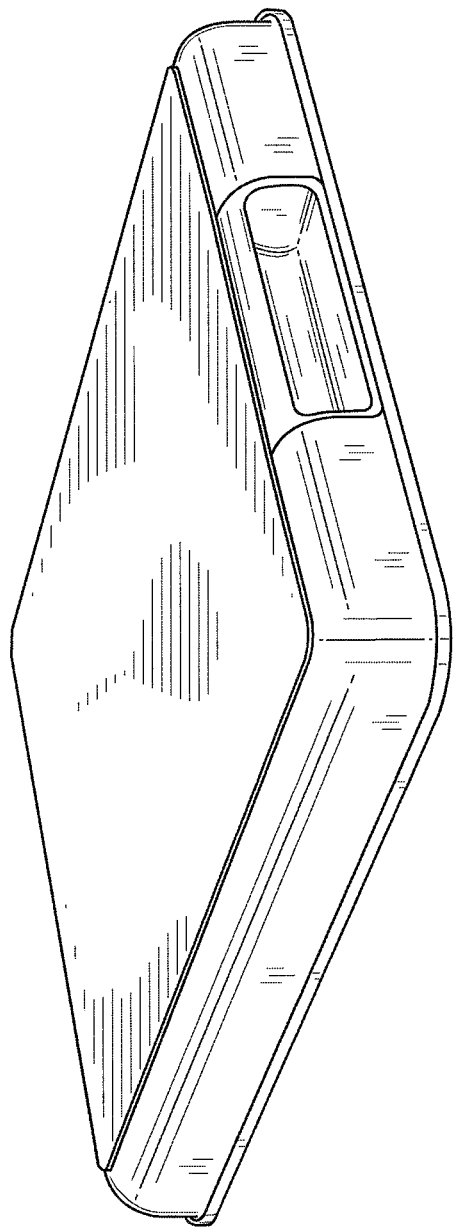
FIGS. 2A-2E are different elevation views of the multi-function lid of the sous-vide cooker of FIG. 1.
Figure 2B:
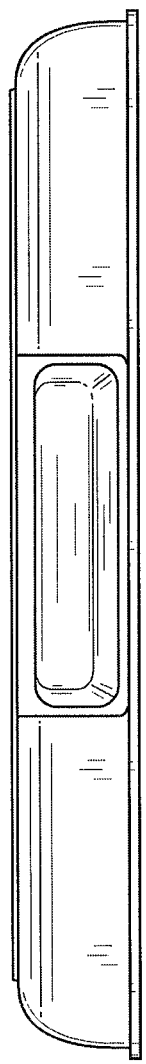
Figure 2C:
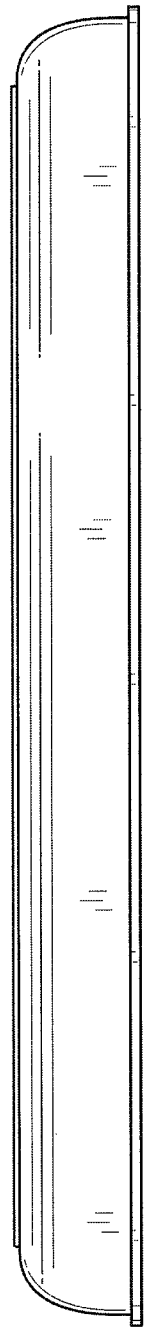
Figure 2D:
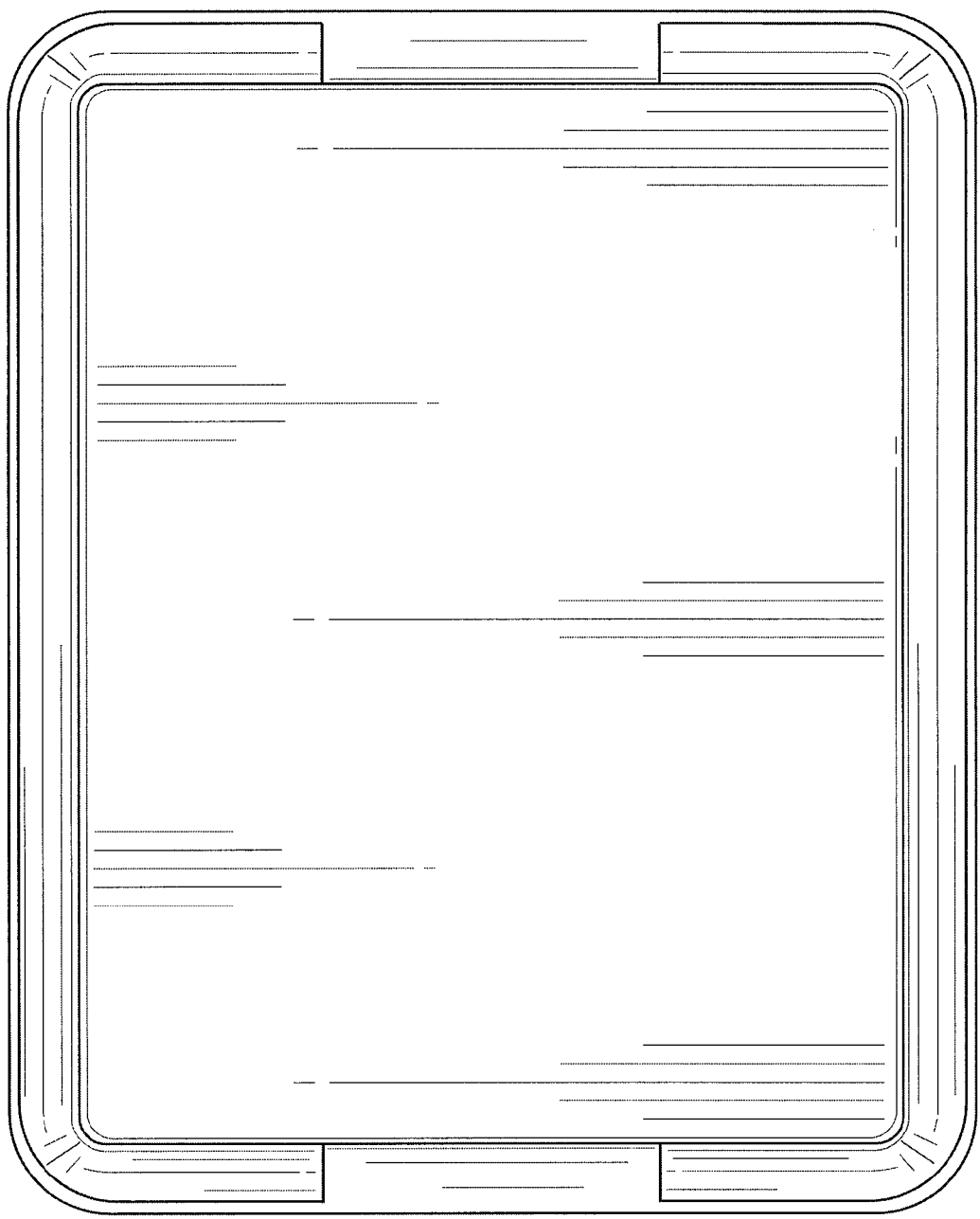
Figure 2E:
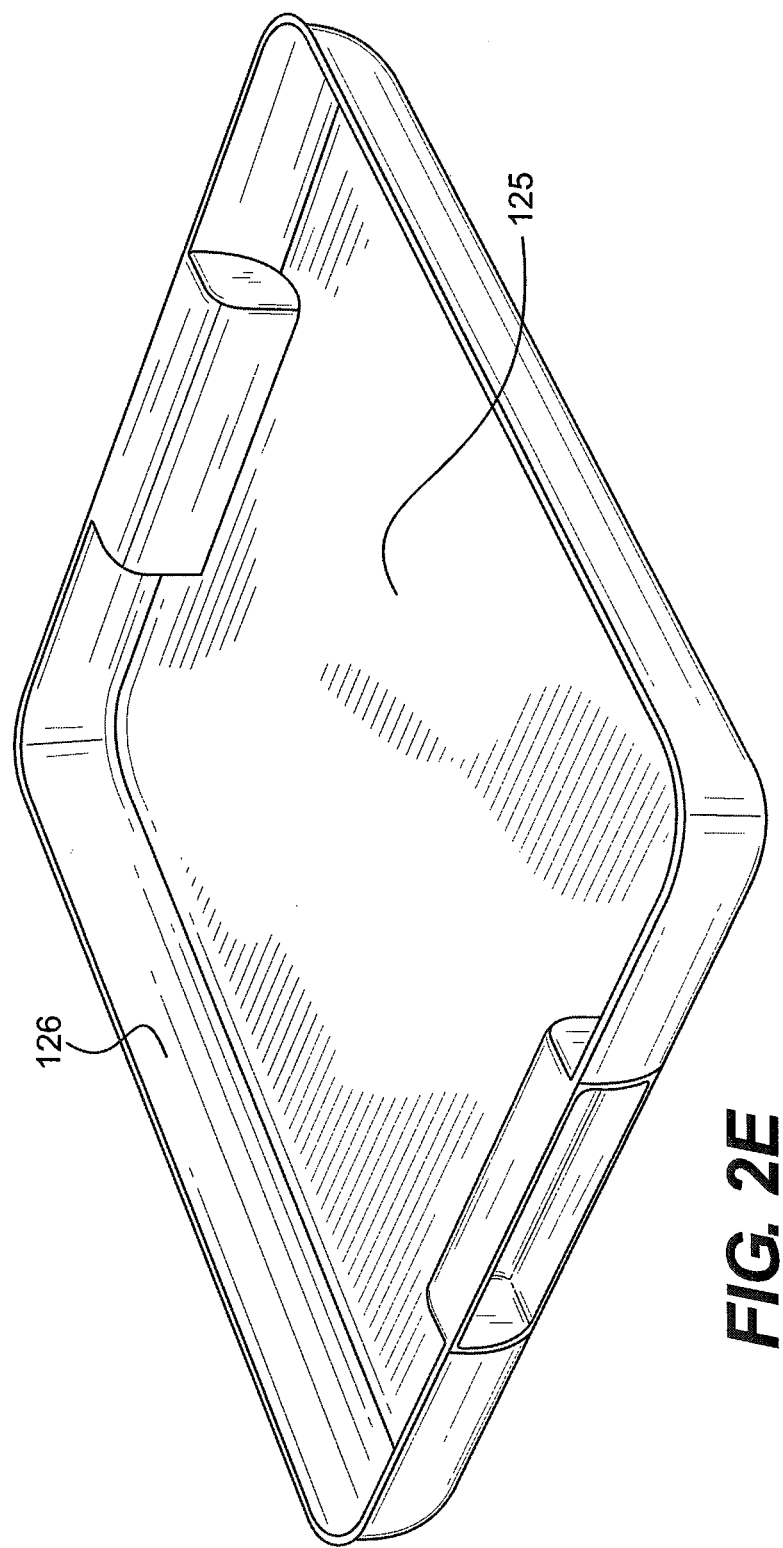

This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "front," "back," "up," "down," "top" and "bottom," as well as derivatives thereof, should be construed to refer to the orientation as then described or as shown in the drawing figure under discussion. These relative terms are for convenience of description and normally are not intended to require a particular orientation. Terms concerning attachments, coupling and the like, such as "connected" and "attached," refer to a relationship wherein structures are secured or attached to one another either directly or indirectly through intervening structures, as well as both movable or rigid attachments or relationships, unless expressly described otherwise.

Referring now to FIG. 1, an embodiment of a sous-vide cooker 100 contains a cooking chamber assembly 110, a heating system 140, and a housing 160 that houses the cooking chamber assembly 110 and the heating system 140. The cooking chamber assembly 110 contains a cooking chamber 111 that contains the water for sous-vide cooking, a multi-function lid 112 that covers the cooking chamber 111, a passive circulator 114 and, optionally, a food rack 115.

The cooking chamber 111 comprises a bottom wall 116 and side walls 117, all integrally joined to form an open top container. The cooking chamber 111 may be made of any material with suitable strength and thermal conductivity, such as metals, alloys, glasses, ceramics, and certain plastics. In one embodiment, the cooking chamber 111 is made of stainless steel. In another embodiment, the cooking chamber 111 is made of anodized aluminum. In yet another embodiment, the bottom wall 116 of the cooking chamber 111 is made of a thermal conductive material while the side walls 117 of the cooking chamber 111 are made of non-thermal conductive material to reduce heat loss during cooking. Portions of the cooking chamber may be made of glass or other see-through material. This allows viewing of the food during the cooking process. In yet another embodiment, the cooking chamber 111 contains a drain outlet (not shown) on the bottom wall 116 or on a lower portion of the side wall 117. The drain outlet can be controlled by a valve or a plug. In one embodiment, the cooking chamber assembly further contains a gasket 113 that provides a seal between the cooking chamber 111 and the lid 112.

As shown in FIGS. 1 and 2A-2G, the multi-function lid 112 has a shape and size that fits the open top of the cooking chamber 111, so that when the lid 112 is placed on top of the cooking chamber 111, it forms a seal with the gasket 113. In this embodiment, the multi-function lid 112 comprises a rectangular shaped flat end wall 121, skirts 122 that integrally join the end wall 121 on the periphery and extend downward from the periphery of the end wall 121, and handles 123 that facilitate the removal of the lid 112. The skirts 122 allow the lid 112 to be turned upside down to serve as a preparation station before the cooking process, and as a draining station to remove food items from the sealed parcels after cooking. The skirts 122 will hold any dripping water as well as to capture any fluid dripping from the food parcels when plastic bags are opened. The lid 112 can be made from any material with suitable strength. In one embodiment, the end wall 121 and the skirts 122 are made from stainless steel or aluminum and the handles 123 are made from plastics. In a preferred embodiment, the top surface of the end wall 121 is covered with an heat insulating layer 124 to minimize heat loss during cooking. In one embodiment, the heat insulating layer 124 comprises a heat insulating fabric or plastics. In another embodiment, the interior surfaces of the lid 112 (i.e., the bottom surface 125 of the end wall 121 and the interior surfaces 126 of the skirts 122, see FIG. 2E) are covered with a layer of insulating fabric or coating material to minimize heat loss during cooking. In another embodiment, the interior surfaces of the lid 112 is covered with a layer of heat reflective material. In another embodiment, the end wall 121 and the skirts 122 are made from materials with low thermal conductivity, such as plastics, to minimize heat loss. In another embodiment, the end wall 121 and the skirts 122 are made from glass or ceramics. In another embodiment, the lid 112 is molded as a single piece to minimize production cost. In yet another embodiment, the lid contains a transparent window that allows a user to see the food items insider the cooking chamber 111 without opening the lid 112. FIGS. 2A-2E show different elevation views of an embodiment of the lid 112.

Figure 3:
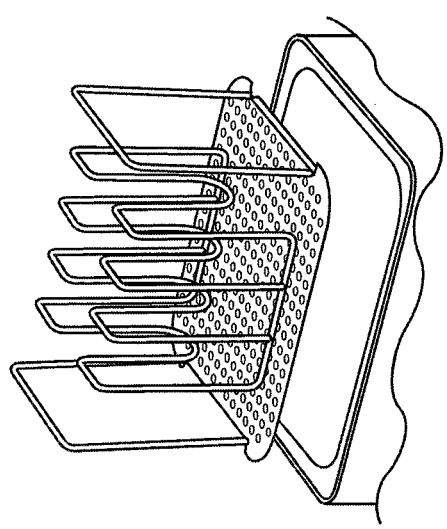
FIG. 3 is a schematic showing a passive circulator with a food rack.

Referring again to FIG. 1, the passive circulator 114 comprises a plate 131 with circulating holes 132. The passive circulator 114 is placed at the bottom of the cooking chamber 111 or near the a bottom interior surface of the chamber 111 and cover a large fraction of the bottom surface of the cooking chamber 111. When the cooking chamber 111 is heated from the bottom, the heated water rises from the bottom and forms rising currents through the circulating holes 132. These rising currents create turbulence in the cooking chamber 111 and facilitate uniform temperature distribution within the water inside the cooking chamber 111. In one embodiment, the passive circulator 114 is placed on wire handle 133 so that the passive circulator 114, as well as the food parcels inside the cooking chamber 111, may be easily pulled from the water without using tongs or other instruments (FIG. 3).

Figure 4C:
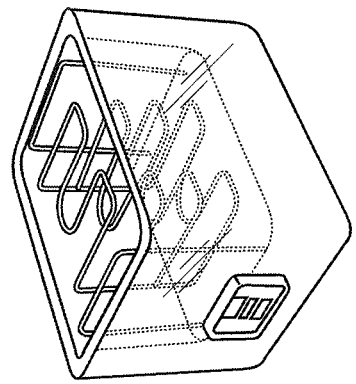
FIGS. 4A-4C show various placement a food rack inside the cooking chamber of the sous-vide cooker of FIG. 1.
Figure 4B:
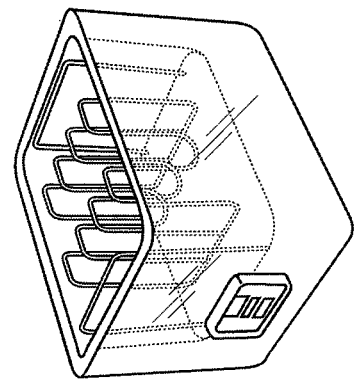
Figure 4A:
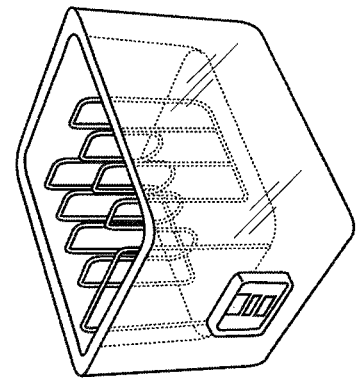

The food rack 115 serves to hold the packages in proper orientation in locations, to prevent food parcels from touching each other so that food items in each parcel are surrounded by water in all directions for appropriate heat exchange with the parcel. As shown in FIGS. 4A-4C, the food rack 115 may be placed in different positions inside the cooking chamber 111 to adopt to food parcels of different sizes. For example, the food rack 115 may hold five average size parcels in the normal usage position shown in FIG. 4A, three large size parcels in the position shown in FIG. 4B, and three larger size parcels in the lie-down position shown in FIG. 4C. With this design, the same food rack may be re-orientated into different positions to accommodate food parcels of different sizes and shapes.

Figure 5:
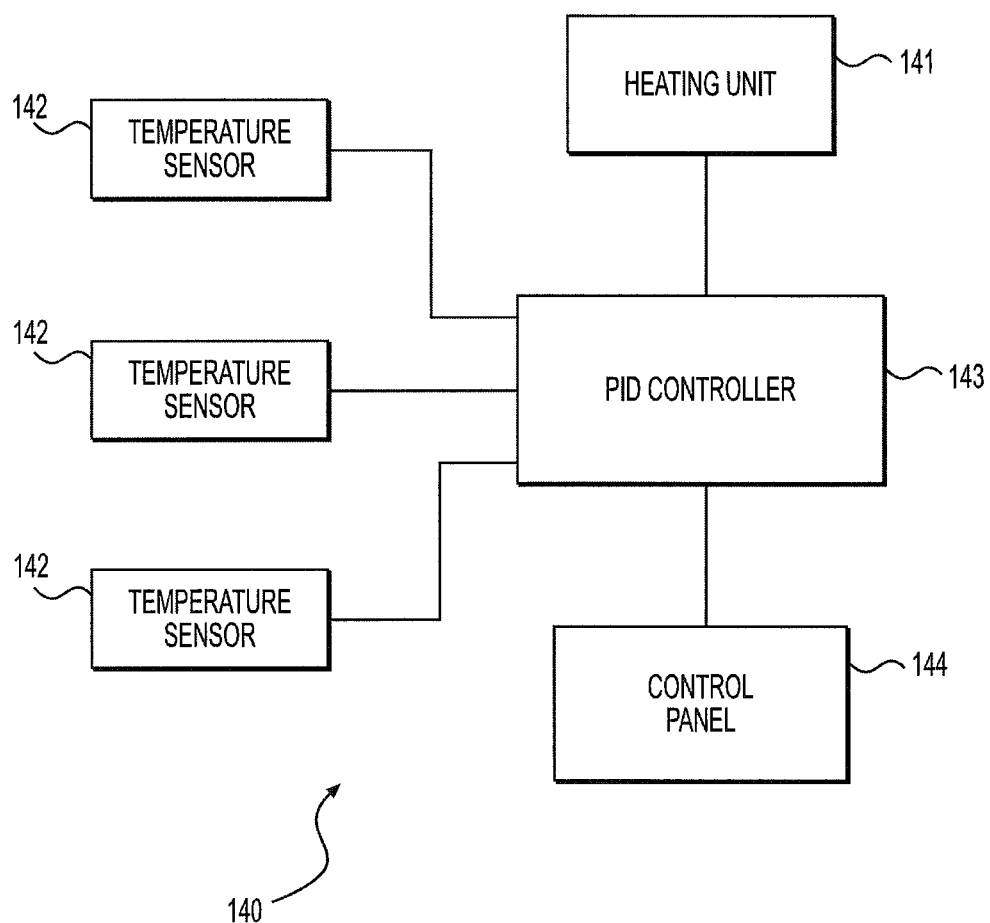
FIG. 5 is a schematic drawing of an embodiment of the heating system of the sous-vide cooker of FIG. 1.

Referring now to FIG. 5, the heating system 140 comprises a heating unit 141, one or more temperature sensors 142, a proportional-integral-derivative (PID) controller 143, and a display panel 144. The heating unit 141 may be any type of heating device capable of heating the bottom wall 116 and/or side walls 117 of the cooking chamber 111 in a evenly and controllable manner. In one embodiment, the heating unit 141 is a flat heating plate or heating pad that is attached to (e.g., by screws or bonding), or in contact with, the bottom of the cooking chamber 111.

In one embodiment, heating unit 141 is formed of a pair of layers of rubber-like material, such as silicone rubber polymer, and electrical resistance coils embedded between the two layers of rubber-like material. The rubber-like layer may be fortified with a glass fiber layer. In certain embodiments, the heating unit 141 is attached to the outside surfaces of the bottom wall 116 and/or side walls 117 of the cooking chamber 111. In one embodiment, the heating unit 141 is pressed against the bottom wall 116 of the cooking chamber 111 by a fixing plate 186, which is attached to the bottom wall 116 of the cooking chamber 111 by screws. In another embodiment, the heater layer purposely does not cover the lower corners of the cooking chamber 111 so that temperature sensors 142 may be mounted to the cooking chamber wall at the corners.

The one or more temperature sensors 142 are attached to the exterior surface of the bottom wall 116 and/or exterior surface of side walls 117 (i.e., outside walls 117'). In certain embodiments, a single sensor 142 is used in the sous-vide cooker 100. In one embodiment, the single sensor 142 is attached to the lower portion of the outside wall 117' of the cooking chamber 111 (e.g., 20-30 mm from the bottom of the outside wall 117'). In other embodiments, a plurality of temperature sensors 142 are attached to both the exterior surface of the bottom wall 116 and the outside walls 117'. In another embodiment, the temperature sensors 142 are vertically spaced on the outside of the cooking chamber 111 to detect the temperature differential between the portion of the cooking chamber covered by the heated water and the portion not covered by the heated water. When the temperature differential between a sensor at a lower portion of the cooking chamber 111 and a sensor at a higher portion of the cooking chamber 111 reaches a preset value, the control algorithm will send out a signal indicating that the water level in the cooking chamber 111 is low. In one embodiment, these sensors are located at different heights along the outside wall 117' of the cooking chamber 111.

The PID controller 143 uses a loop feedback mechanism to maintain the water temperature in the cooking chamber 111 at a preset temperature. Briefly, the PID controller contains a microprocessor that controls the heating unit 141 using an algorithm involving three separate parameters; the proportional (P), the integral (I) and derivative (D) values. The proportional value P determines the reaction to the current error, the integral value (I) determines the reaction based on the sum of recent errors, and the derivative value (D) determines the reaction based on the rate at which the error has been changing. The weighted sum of these three actions constitutes the manipulated variable (MV), which is used to adjust the heating process via a control element such as the power supply of a heating element:

$$MV(t) = P_{out} + I_{out} + D_{out}$$

where $P_{out}$, $I_{out}$, and $D_{out}$ are the contributions to the output from the PID controller from each of the three terms, as defined below.

The proportional term ($P_{out}$) makes a change to the output that is proportional to the current error value. The proportional response can be adjusted by multiplying the error by a constant $K_p$, called the proportional gain. The proportional term is given by:

$$P_{out} = K_p e(t)$$

where
$P_{out}$: Proportional term of output
$K_p$: Proportional gain, a tuning parameter
e: Error=set temperature (ST)–measured temperature (MT)
t: Time or instantaneous time (the present)

The contribution from the integral term ($I_{out}$) is proportional to both the magnitude of the error and the duration of the error. Summing the instantaneous error over time (integrating the error) gives the accumulated offset that should have been corrected previously. The accumulated error is then multiplied by the integral gain and added to the controller output. The magnitude of the contribution of the integral term to the overall control action is determined by the integral gain, $K_i$.

The integral term is given by: $I_{out} = K_i \int_0^t e(\tau) d\tau$ where
$I_{out}$: Integral term of output
$K_i$: Integral gain, a tuning parameter
e: Error=ST–MT
t: Time or instantaneous time (the present)
τ: a dummy integration variable The integral term (when added to the proportional term) accelerates the movement of the process towards a setpoint and eliminates the residual steady-state error that occurs with a proportional only controller. However, since the integral term is responding to accumulated errors from the past, it can cause the present value to overshoot the setpoint value (cross over the setpoint and then create a deviation in the other direction).

The rate of change of the process error is calculated by determining the slope of the error over time (i.e., its first derivative with respect to time) and multiplying this rate of change by the derivative gain $K_d$. The magnitude of the contribution of the derivative term (sometimes called rate) to the overall control action is termed the derivative gain, $K_d$.

The derivative term is given by:

$$D_{out} = K_d \frac{d}{dt} e(t)$$

where
$D_{out}$: Derivative term of output
$K_i$: Derivative gain, a tuning parameter
e: Error=ST–MT
t: Time or instantaneous time (the present)

The derivative term slows the rate of change of the controller output and this effect is most noticeable close to the controller setpoint. Hence, derivative control is used to reduce the magnitude of the overshoot produced by the integral component and improve the combined controller-process stability.

The measured temperature MT is determined using the following temperature determination algorithm:

$$MT = (k_1 T_1 + k_2 T_2 + \ldots + k_n T_n)/n$$

where
n is the number of temperature sensors,
$T_1 \ldots T_n$ are temperatures measured by individual sensors, and
$k_1 \ldots k_n$ are temperature conversion factors that are associated with each individual sensor.

Because the temperature sensor do not have direct contact with the water inside the cooking chamber, the temperatures measured by the temperature sensors may be different from the actual water temperature inside the cooking chamber by a margin of a fraction of degree Fahrenheit to several degrees Fahrenheit, depending on the chamber thermal conductivity of the cooking chamber and the location of the temperature sensor. The temperature conversion factors $k_1 \ldots k_n$ are experimentally determined for each individual temperature sensor so that the measured temperature (MT) reflect the actual water temperature in the cooking chamber. Therefore, the temperature determination algorithm allows for precise measurement and control of the cooking temperature. FIG. 6 shows the circuit diagram of an embodiment of a PID for the sous-vide cooker 100.

Referring again to FIG. 4, the control panel 144 provides a user interface that displays important cooking parameters such as temperature and time. The display panel also contains various buttons to allow a user to enter cooking parameters, such as temperature and time, and select pre-programmed settings. In one embodiment, the display panel 144 is specially graphically designed to allow easy access to pre-programmed settings commonly used in a household, such as setting for steak, pork, chicken and fish. In sous-vide cooking, each of these types of foods is cooked at a predetermined temperature for an extended period of time. The pre-set buttons may correspond to a particular temperature. In another embodiment, an audible signal will sound when the set time for cooking a food product has elapsed and a warning light will blink to alert the operator to remove the food item from the cooking chamber 111. Finally, the heater can be turned-off to allow the food to cool off.

Figure 6A:
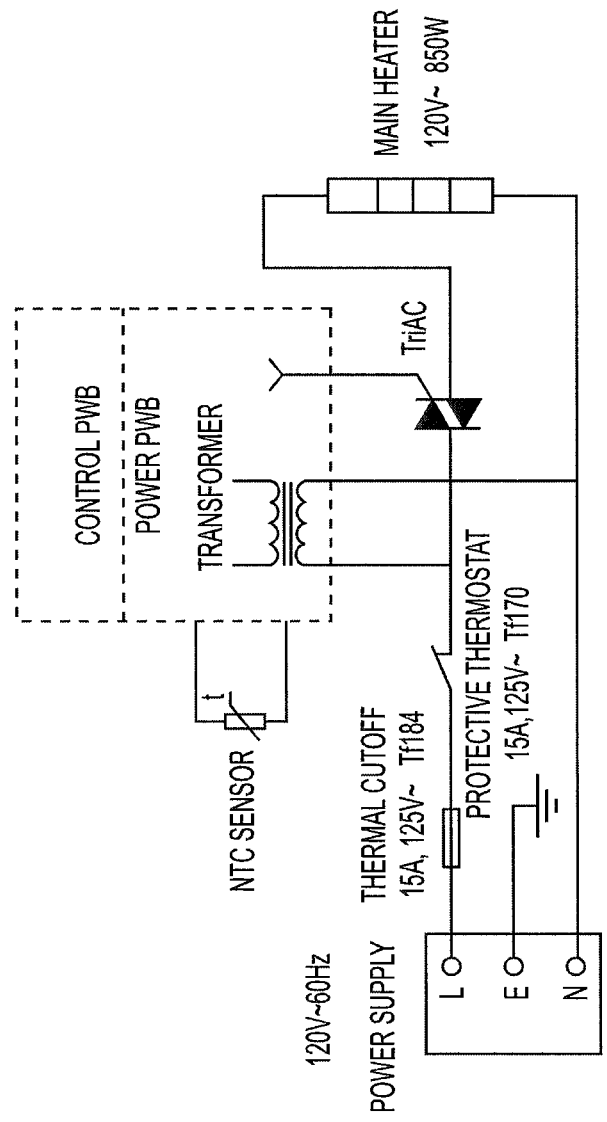
FIG. 6A is a circuit diagram of an embodiment of a PID.
Figure 6B:
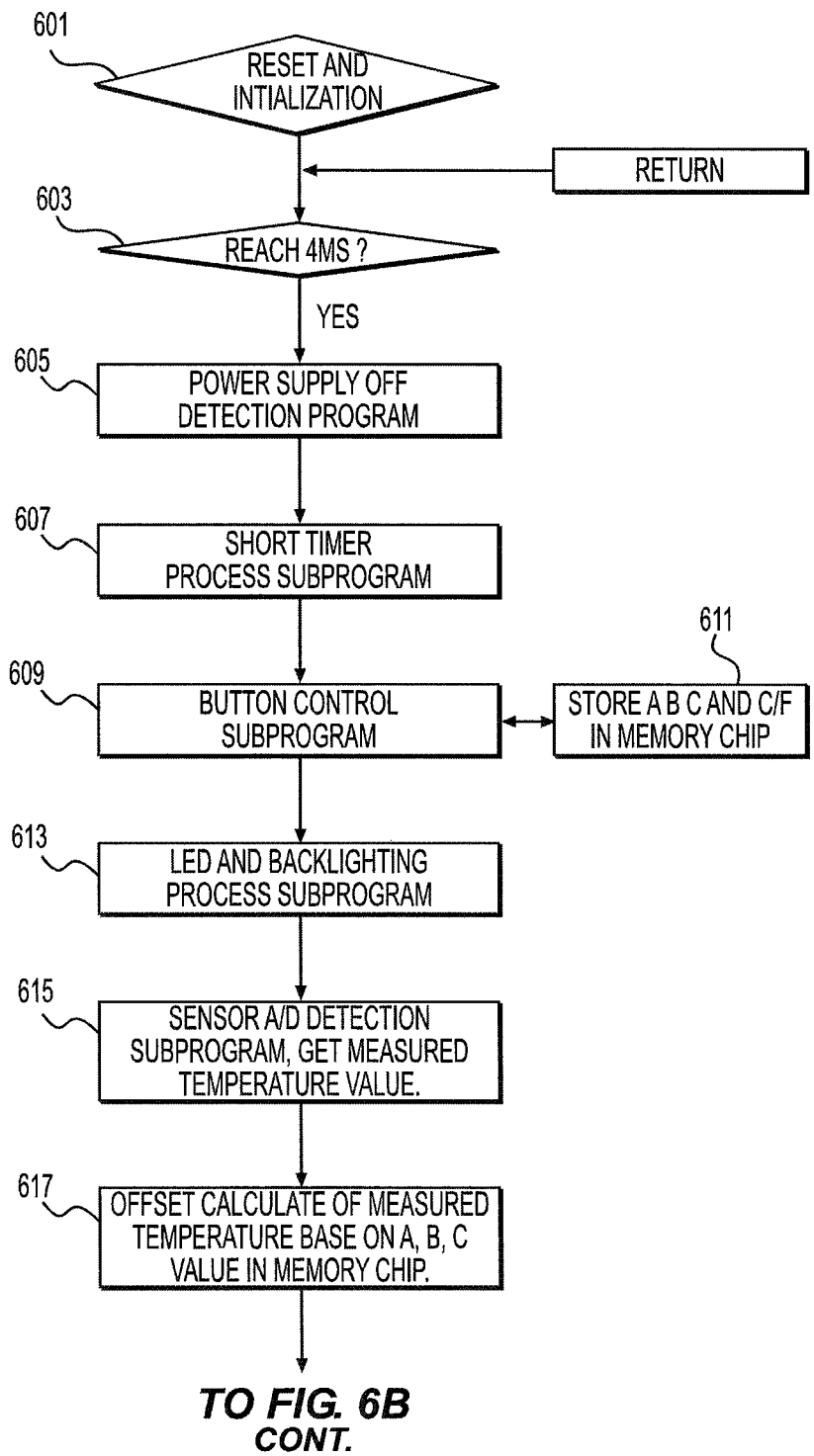
FIG. 6B is a flowchart for the PID program.
Figure 6B:
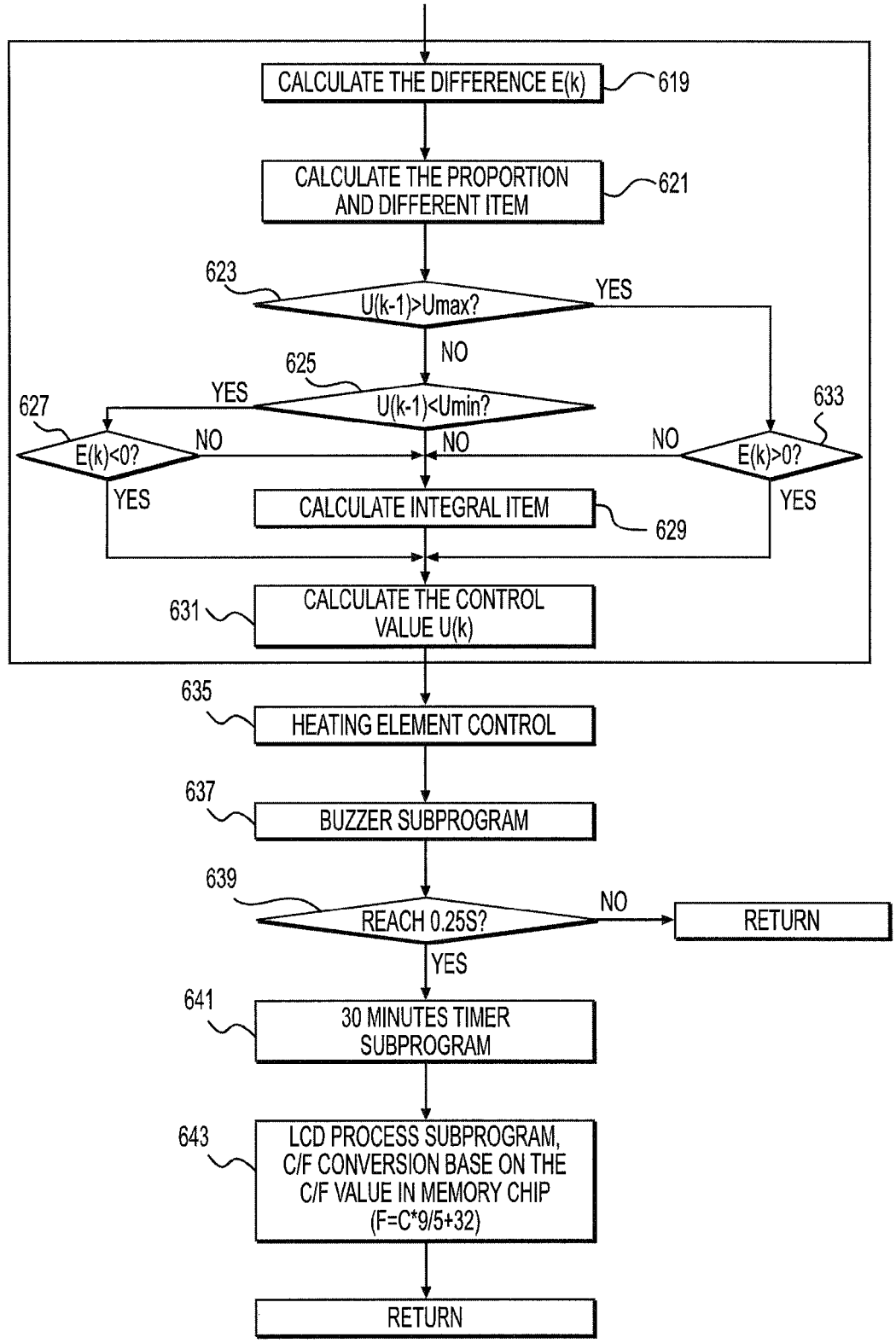

FIG. 6B is a flowchart of an embodiment of a PID program. After initialization (subroutine 601), an internal stopper holds off the process for a short period of time (e.g., 4 milliseconds) to makes sure that the program process step meet desired time limits (subroutine 603). After the short stop, a power supply off detection program checks the status of the power supply (subroutine 605). An short timer process subprogram again makes sure that the program process step meet desired time limits (subroutine 607).

A button control program (subroutine 609) allows the manufacturer to program the PID through a series of tests so that the displayed temperature reflects the actual water temperature inside the cooking chamber. In one embodiment, the PID is initially calibrated at three temperature settings: setting A=30° C., setting B=60° C., and setting C=90° C. Briefly, the cooking chamber 111 is filled with water and the PID is set at a cooking temperature of 30° C. After the setting temperature is reached on the PID display (i.e., the temperature measured by the sensor 142 is 30° C.), the actual water temperature in the cooking chamber 111 is measured directly by placing a reference thermometer inside the water of the cooking chamber 111. The difference between the displayed temperature (i.e., the temperature measured by the temperature sensor 142) and the measured temperature (i.e., the actual water temperature measured with the reference thermometer) at the 30° C. setting is entered and stored on a memory chip inside the PID (subroutine 611) together with the conversion factor between Celsius and Fahrenheit (C/F). This process is repeated at the temperature settings of 60° C. and 90° C. The stored temperature differences, referred to as adjustment values "A," "B" and "C" for adjustment made at 30° C., 60° C. and 90° C., respectively, used by the PID controller to achieve precise control of the cooking temperature in future temperature control cycles.

The program then adjusts the LED display and back lightening through a LED and back lightening subprogram (subroutine 613). Temperature measured by the temperature sensor is changed from an analog signal to a digital value by the sensor A/D detection subprogram (subroutine 615), and calculates the actual cooking temperature inside the cooking chamber 111 by the temperature offset subprogram (subroutine 617) using a temperature correction algorithm and the stored "A," "B," and "C" adjustment values. In one embodiment, the temperature correction algorithm creates a temperature adjustment curve using the stored adjustment values. The temperature adjustment curve can be created with a straight line method, a best fit method or any other method commonly used in the art. For each measured temperature Tm, the curve provides a temperature adjustment value Td. The temperature correction algorithm then calculates actual temperature value Ta using the formula Ta=Tm+Td.

In one embodiment, the program calculates the difference $E_{(k)}$ between the setting temperature and the calculated actual temperature Ta (subroutine 619) and calculates the proportion and differential items (subroutine 621). The program then decides whether the control value (i.e., the output of the PID controller 143) of the previous calculation $U_{(k-1)}$ is greater than the maximum value of the output of the PID controller in prior iterations $U_{max}$ (subroutine 623). If $U_{(k-1)}$ is not greater than $U_{max}$, the program then decides whether $U_{(k-1)}$ is smaller than the minimum value of the output of the PID controller in prior iterations $U_{min}$ (subroutine 625). If $U_{(k-1)}$ is smaller than $U_{min}$, the program decides whether $E_{(k)}$ is smaller than zero (subroutine 627). If $E_{(k)}$ is not smaller than zero, the program calculates a new integral item (subroutine 629) and then the new control value $U_{(k)}$ based on the calculated proportion, differential and integral items (subroutine 631). If $E_{(k)}$ is smaller than zero, the program bypasses the subroutine 629 and goes directly to subroutine 631. If $U_{(k-1)}$ is greater than $U_{min}$, the program calculates a new integral item (subroutine 629) and then the new control value $U_{(k)}$ based on the calculated proportion, differential and integral items (subroutine 631).

Referring again to subroutine 623, if $U_{k-1}$ is greater than $U_{max}$, the program then decides whether $E_{(k)}$ is greater than zero (subroutine 633). If $E_{(k)}$ is not greater than zero, the program calculates a new integral item (subroutine 629) and then the new control value $U_{(k)}$ based on the calculated proportion, differential and integral items (subroutine 631). If $E_{(k)}$ is greater than zero, the program bypasses the subroutine 629 and goes directly to subroutine 631.

The heating unit 141 is controlled based on the control value $U_{(k)}$ through a heating element control program (subroutine 635). A buzzer subprogram provides an audio signal to the user if over heating is detected or if the set cooking time is reached (subroutine 637). At this stage, another internal stopper is provided to makes sure that the program process step meet desired time limits (subroutine 639). If the program process has not reached the desired time limit (e.g., 0.25 second), the program starts another cycle at subroutine 603. If the program process has reached the desired time limits, the program moves to the next step to confirm the power supply status through a 30 minutes timer subprogram (subroutine 641) that keeps a 30 minute working status memory when power is cutoff suddenly. The program then displays the temperature with an LCD process subprogram (subroutine 643) and returns to subroutine 603 to start a new cycle.

Figure 6C:
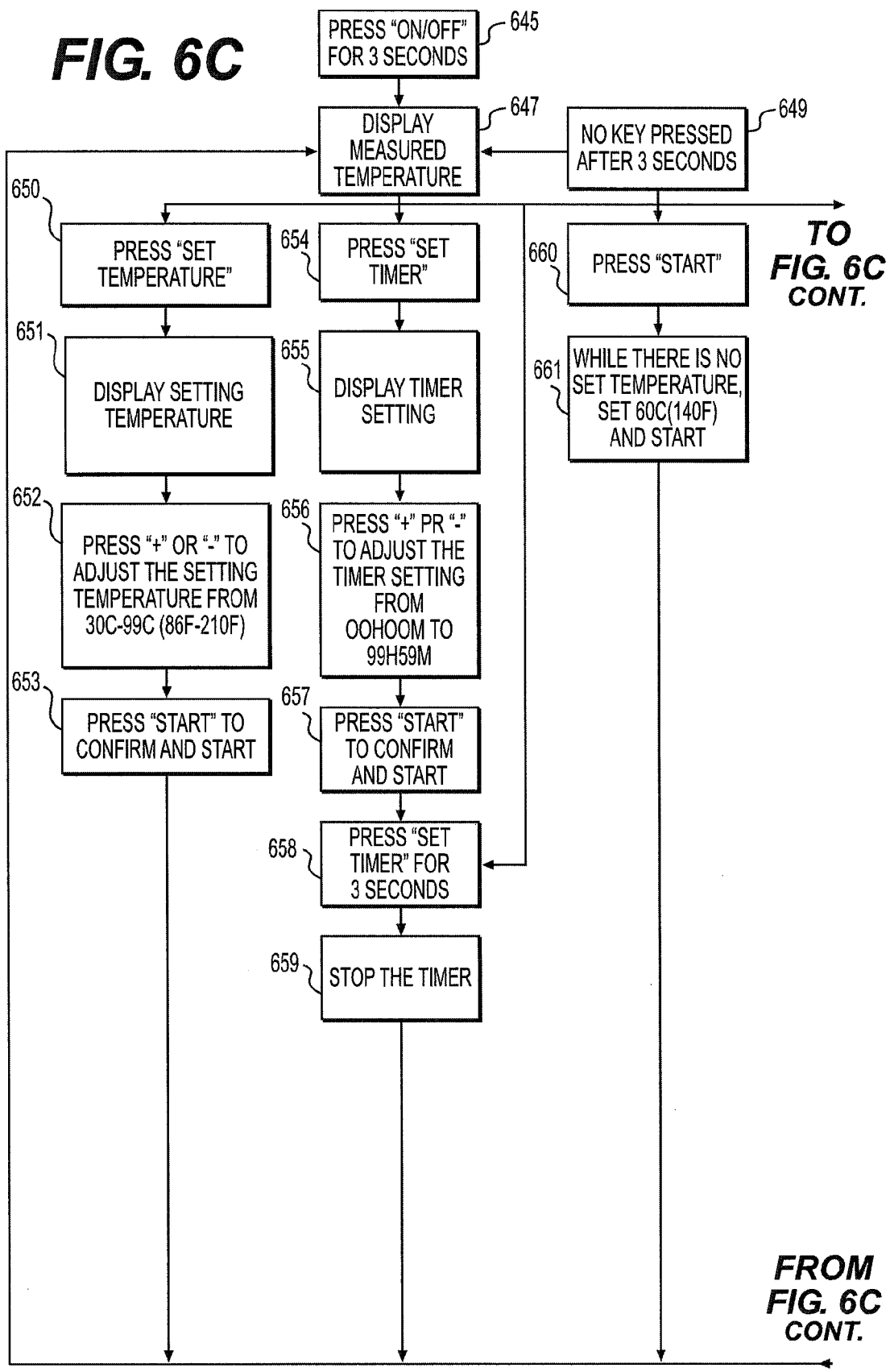
FIG. 6C is a flowchart for the PID button control subprogram program.
Figure 6C:
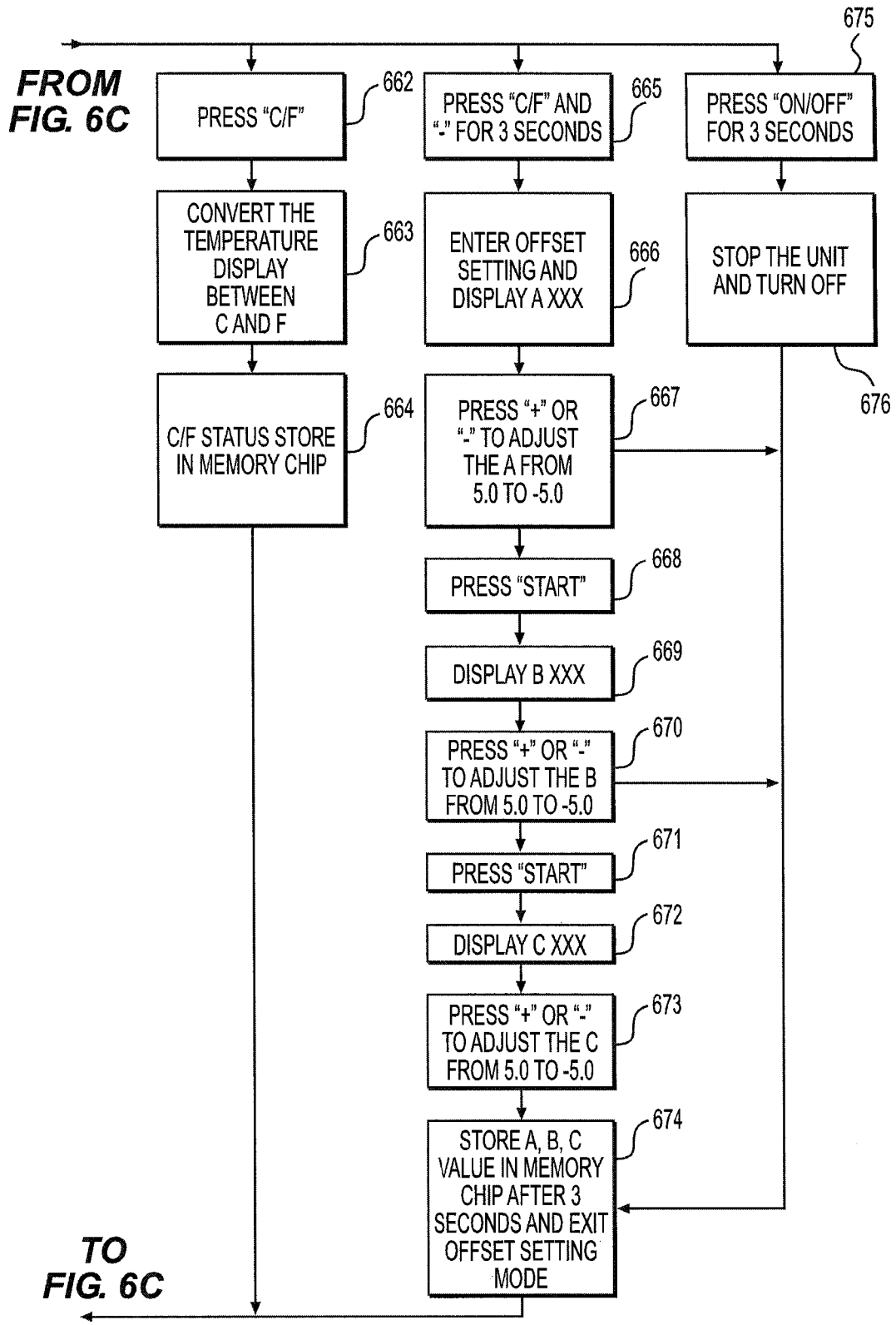

FIG. 6C is a flowchart showing more details of the PID button control subprogram program. Steps 650-653 are used to set up a cooking temperature. Steps 654-659 are used to set up the timer. Steps 662-664 are used to convert temperature display between Celsius and Fahrenheit. Steps 665-674 are used to enter and store "A," "B," and "C" values.

Figure 7B:
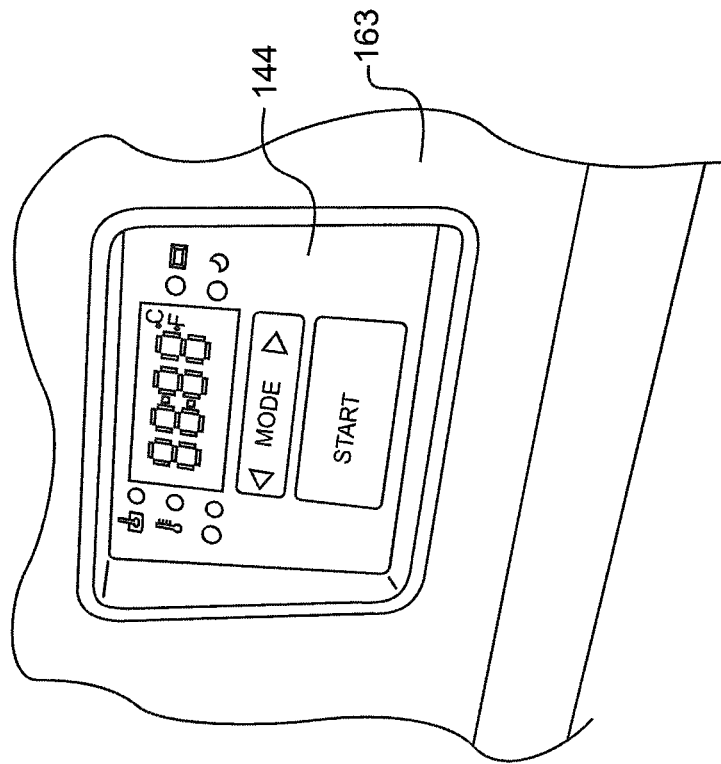
FIGS. 7A-7B are pictures showing embodiments of the control panel.
Figure 7A:
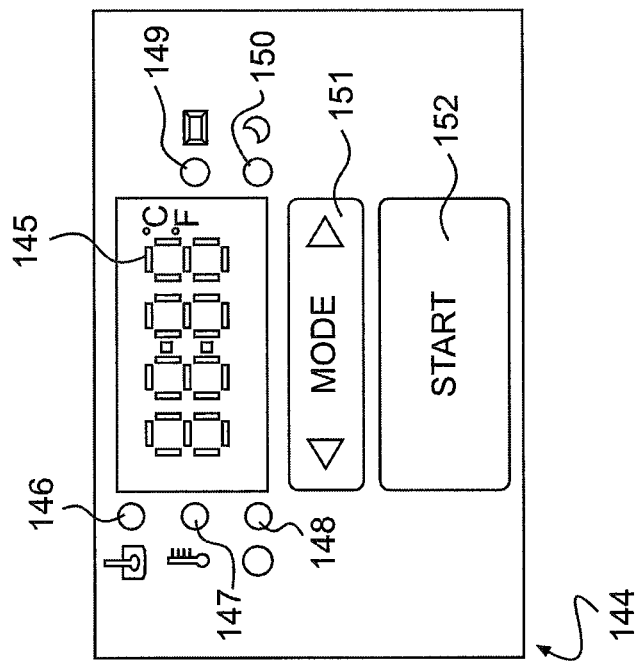
Figure 8A:
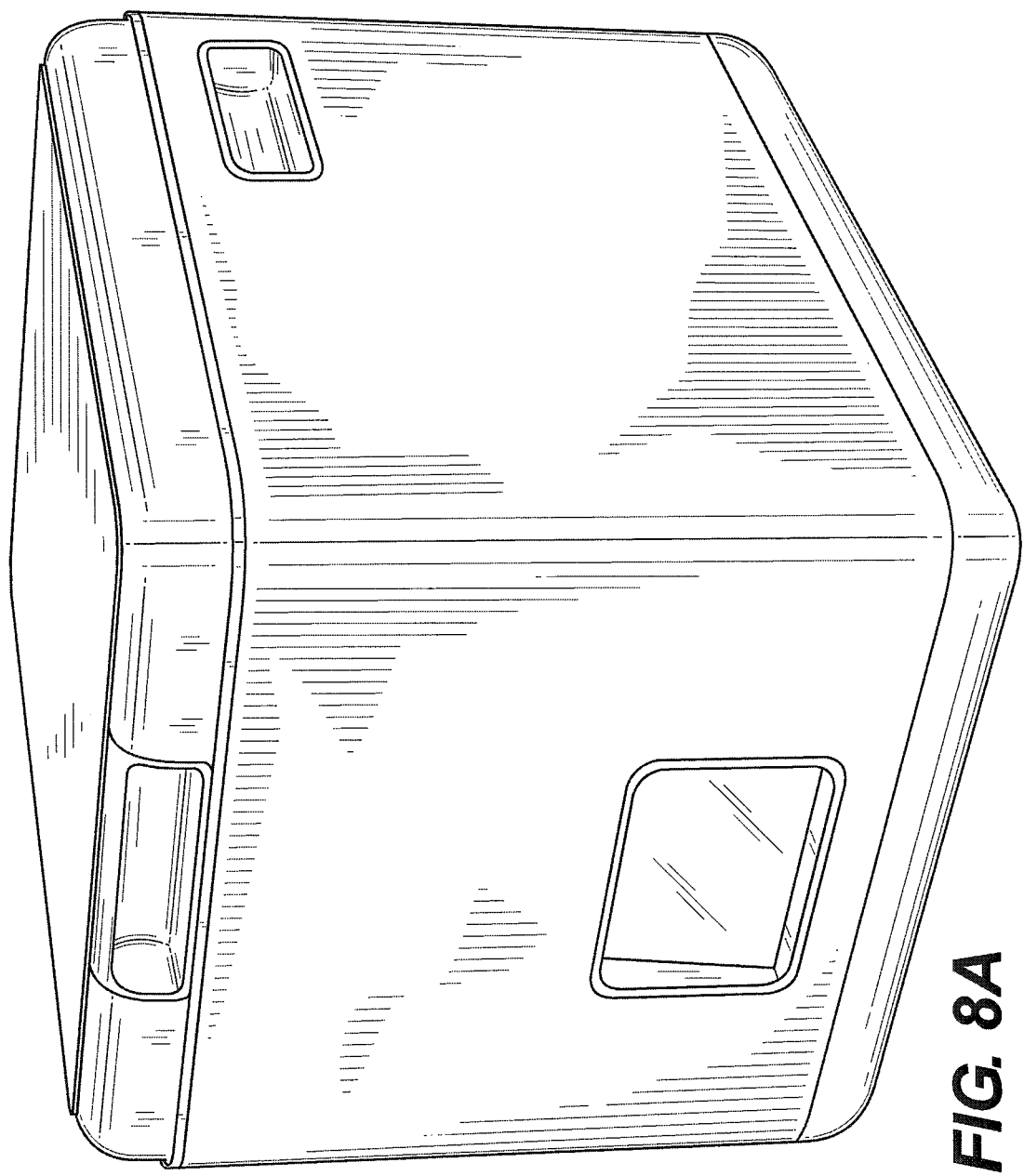
FIGS. 8A-8F are different elevation views of an assembled sous-vide cooker.
Figure 8B:
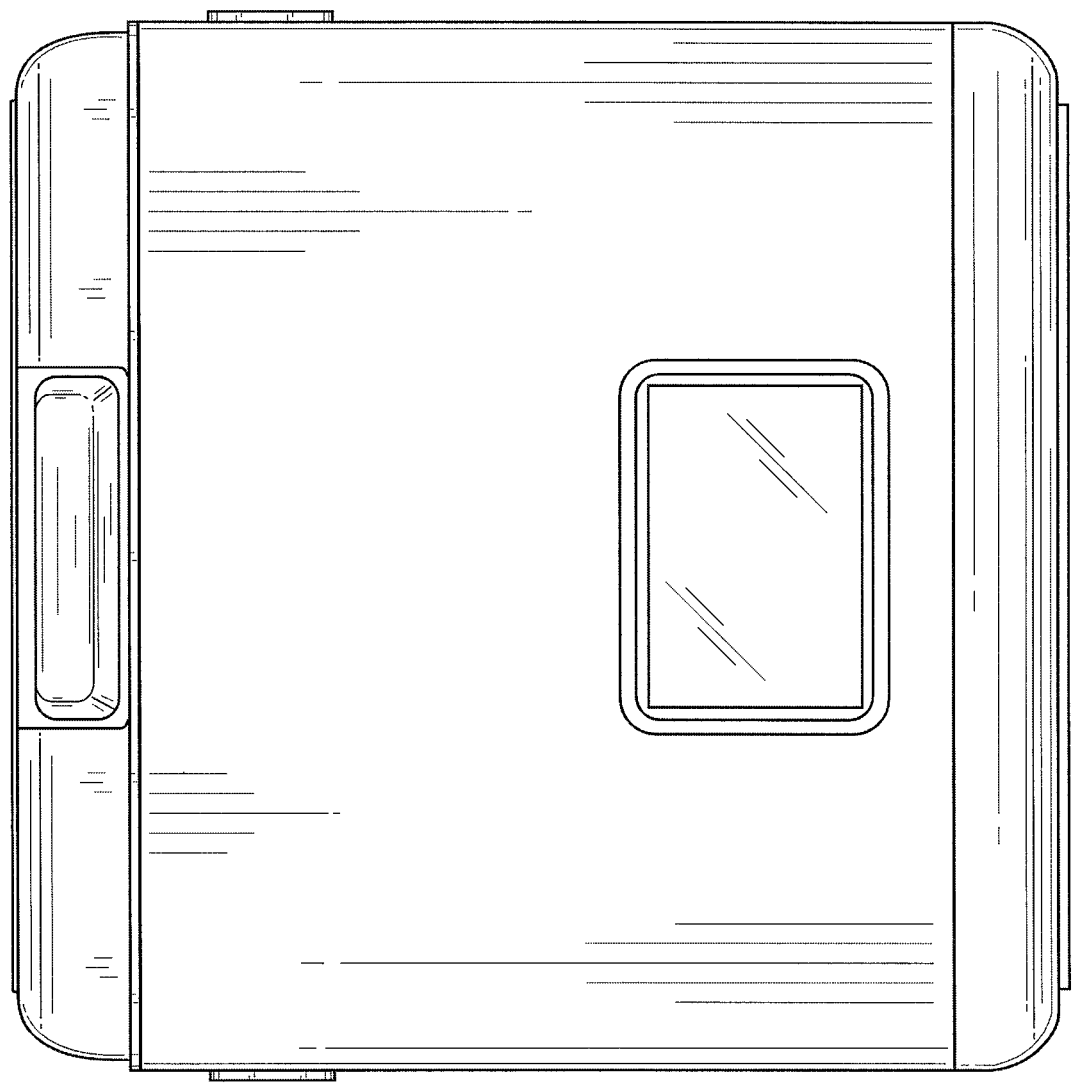
Figure 8C:
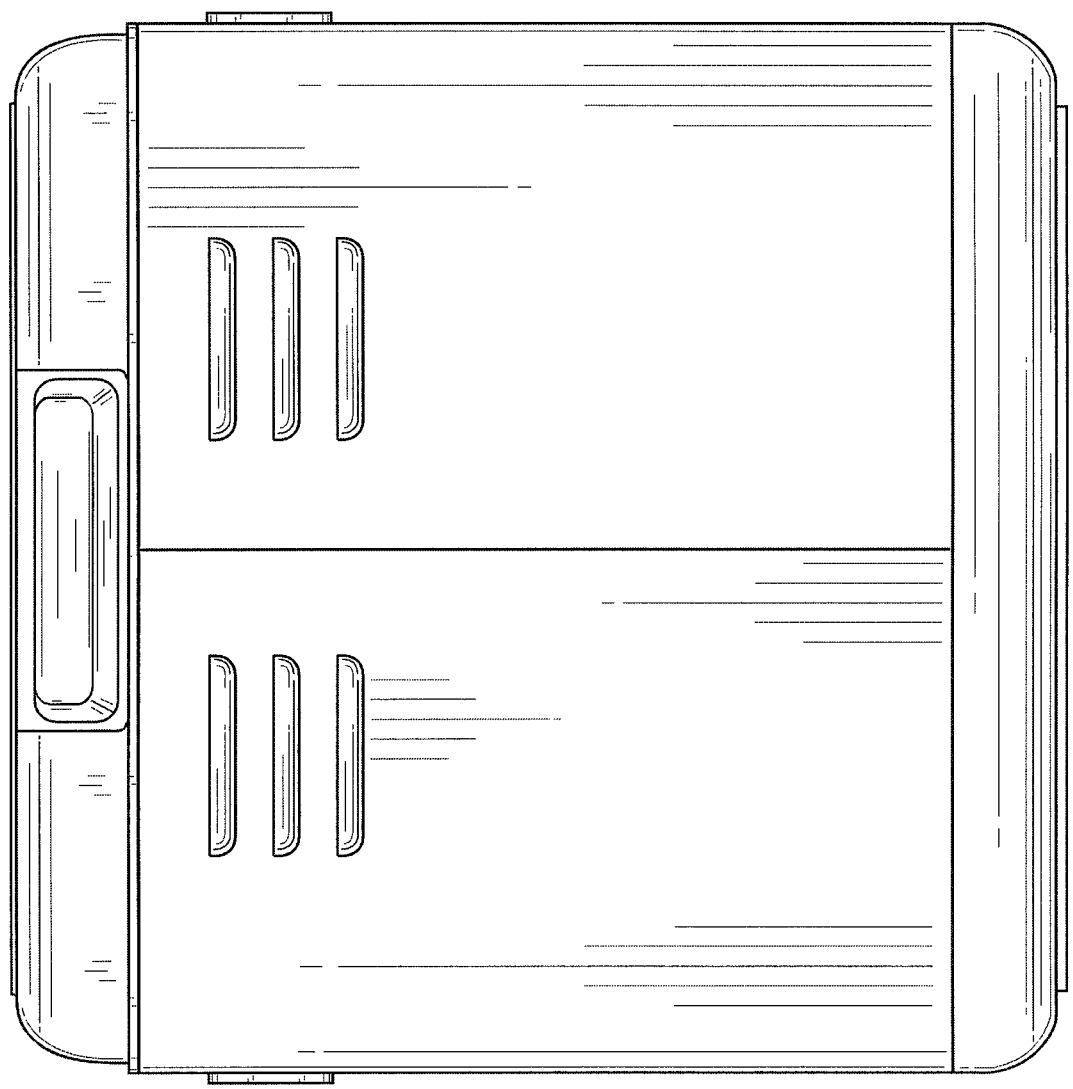
Figure 8D:
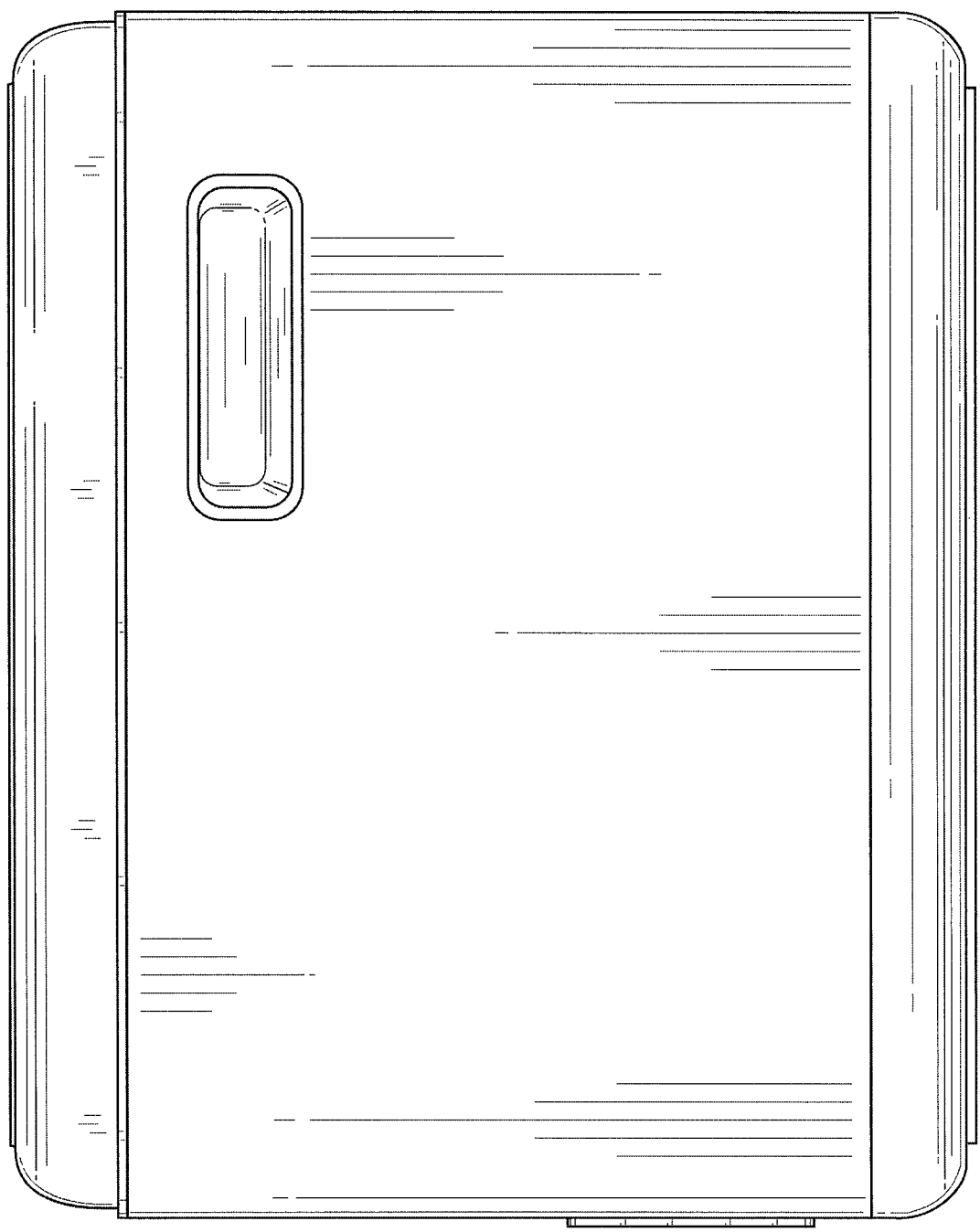
Figure 8E:
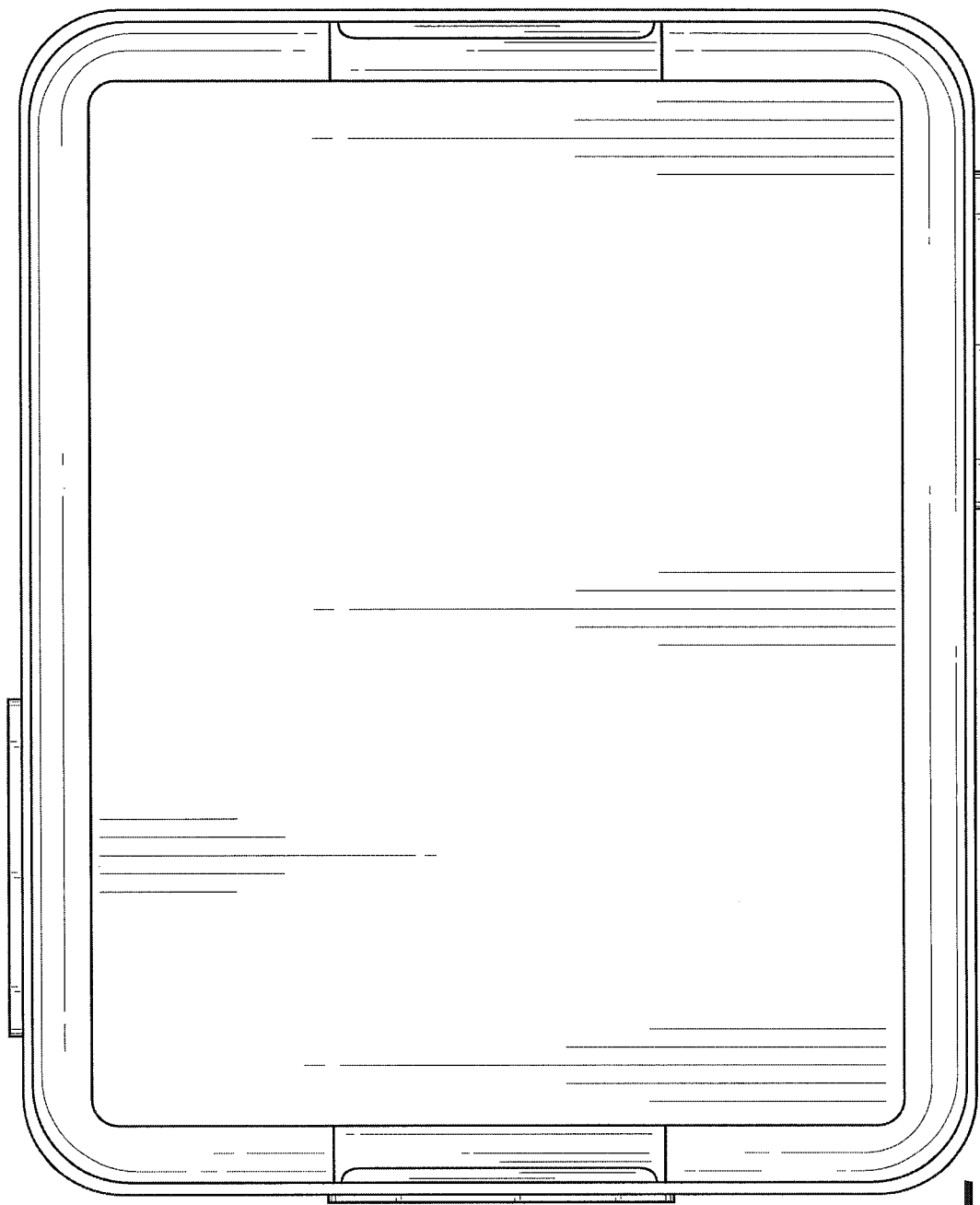
Figure 8F:
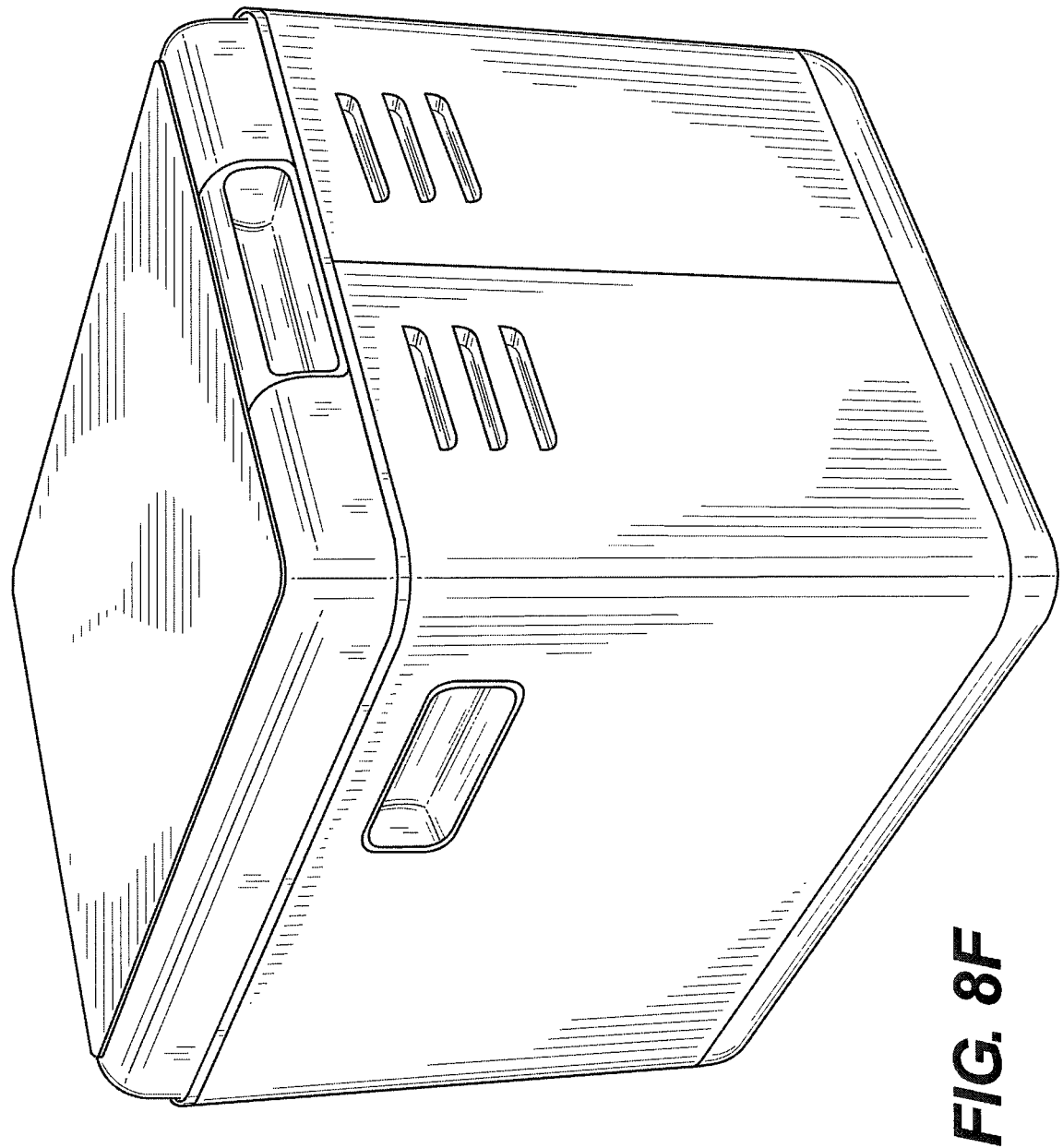

FIG. 7A shows an embodiment of a control panel 144. In this embodiment, the control panel 144 contains a digital LED display 145, mode lights 146, 147 and 148 showing the display mode (e.g., water temperature, set temperature and time), function lights 149 and 150, mode selection button 151 and start button 152. The simple control panel allows a user to easily and conveniently program the temperature and timer functionality. In an embodiment shown in FIG. 7B, the control panel 144 is placed on the front wall 163 of the housing 160 in a slightly sloped manner to allow better observation of the display 145 and easier operation of the buttons. As shown in FIG. 1, in one embodiment, the control panel 144 comprises a panel film 181, a front cover 182, lens 183, control printed wiring board (PWB) 184 and rear cover 185.

In one embodiment, the heating system 140 is capable of providing a cooking temperature in the range from about 5° C. above ambient temperature to about 95° C. (e.g., from about 20° C. to about 95° C.), and maintaining the cooking temperature within about 1.0° C., preferably about 0.5° C., more preferably about 0.2° C., most preferably about 0.1° C. of a set temperature. For example, if the cooking temperature is set at 65° C., the heating system would preferably maintain the water temperature in the cooking chamber in the range of 65±0.5° C., 65±0.4° C., 65±0.3° C., 65±0.2° C., or 65±0.1° C., depending on the requirements of particular applications. Depending on the location of the sous-vide cooker, the ambient temperature can be in the range of 0° C. to 30° C., preferably 15° C. to 25° C.

In an embodiment, the timer display has a 1 minute resolution and a time setting between 00 hr:00 min and 99 hr:59 min. The control panel will emit an over temperature alarm when the water temperature in the cooking chamber 111 is 3° C., 4° C., or 5° C. over the set temperature. The control panel will also emit an audible buzz and/or a "end" message on the display when a preset cooking time elapses. In one embodiment, the heating system further contains a protective thermostat 187 and a thermal cutoff 188 to prevent over heating.

Cooking cycles start times and shut-off times may all be programmed in advance using the control panel 144. For example, frozen food may be placed in the cooker and scheduled for cooking later in the day. Different cooking cycles may be programmed and scheduled for defrost, cooking, warm and cool-down.

Referring again to FIG. 1, the housing 160 comprises four walls, i.e., two side walls 161, 162, a front end wall 163, a rear end wall 164, and a base 165. In this embodiment, the sidewalls 161 and 162 each contain a handle 166. The handles 166 are positioned asymmetrically to make it easier for a user to tilt the cooker and empty the cooking chamber 111. In one embodiment, one handle is toward the front of the cooker and the other toward the back. The front end wall 163 contains a window 167 that matches the size of the control panel 144. The rear end wall 164 includes a plurality of vents 168 at the upper portion of the rear end wall 164. The walls of the housing 160 are spaced closely with the sidewalls 117 of the cooking chamber 111 so as to create a chimney effect to constantly vent the hot air at the lower portion of the housing 160 out through the vents 168. The term "chimney effect", also noted as the "stack effect," refers to the tendency of heated air or gas to rise in a duct or other vertical passage, as in a chimney, small enclosure, or building, due to its lower density compared to the surrounding air or gas.

In certain embodiments, the housing 160 and the cooking chamber 111 may have one or more transparent side walls or windows to allow viewing of the food items inside the cooking chamber 111.

The base 165 is attached to the housing 160 through a fixing ring 188 and screws. A ventilated bottom plate 169 on the base 165 allows the cooler air from outside to enter the housing from the bottom of the sous-vide cooker 100 and provide cooling for the PID controller 143 and control panel 144. In one embodiment, the PID controller 143 and the control panel 144 are located in a thermally isolated control chamber 171 to prevent overheating. The base 165 may further contain a power socket 172 to connect to the power cord 173, and rubber foot 174. In another embodiment, a shield is used between the electronics and the cooking chamber 111. In yet another embodiment, a heat sink is used. The shield and heat sink may be combined in a single object. FIGS. 8A-8F show different elevation views of an embodiment of a sous-vide cooker 100.

The combination of the heating, controlling and circulating components, e.g., the heating element 141, NIC sensor 142, PID controller 143, plate 131 and lid 112 makes the temperature inside the cooking chamber 111 accurate and stable. The heated water rising through the holes 132 of the plate 131 creates passive circulation. The lid 112 captures the steam and also reflects heat radiation back into the cooking chamber 111.

The sous-vide cooker is described as being used with water. However, other fluids may be used in the cooking chamber 111.

In the foregoing detailed description, sous-vide cooking devices are described with reference to specific exemplary embodiments. The present specification and figures are to be regarded as illustrative rather than restrictive. The scope of the sous-vide cooking device is to be further understood by the drawings appended hereto, and by their equivalents.

Further, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A sous-vide cooker for use with water, comprising
a cooking chamber comprising:
a chamber body having a bottom interior surface;
a multi-function lid; and
a passive water circulator;
a heating system comprising:
a heating unit;
one or more temperature sensors not in direct contact with any water inside the chamber body;
a proportional-integral-derivative (PID) controller; and
a control panel; and
a housing that houses the cooking chamber and the heating system,
wherein said PID controller uses a temperature correction algorithm that implements a temperature conversion factor so that the temperatures measured by the one or more temperature sensors reflect actual water temperature in the chamber body, and wherein the heating system heats the chamber body and the PID controller controls the temperature using the one or more temperature sensors and the heating unit.

2. The sous-vide cooker of claim 1, wherein the lid comprises an end wall and skirts that integrally join the end wall on the periphery and extend downward from the periphery of the end wall.

3. The sous-vide cooker of claim 1, wherein the lid comprises a heat insulating layer and a heat reflective layer.

4. The sous-vide cooker of claim 1, wherein the passive water circulator comprises a plate with a plurality of holes in the plate.

5. The sous-vide cooker of claim 1, wherein the passive water circulator is located near the bottom interior surface of the chamber body.

6. The sous-vide cooker of claim 1, further comprising a wire handle that is removably placed in the chamber body to facilitate removal of food items from the chamber body.

7. The sous-vide cooker of claim 1, wherein when the chamber body is filled with water, the heating system provides a water temperature in the range from about 5° C. above ambient temperature to about 95° C. with an accuracy of about 0.5° C.

8. The sous-vide cooker of claim 1, wherein the heating system comprises a flat heating plate or heating pad that is in contact with the chamber body.

9. The sous-vide cooker of claim 1, wherein the heating system comprises a single temperature sensor attached to a lower portion of an exterior surface of the chamber body.

10. A sous-vide cooker for use with water, comprising
a cooking chamber comprising:
a chamber body having a bottom interior surface;
a multi-function lid; and
a passive water circulator;
a heating system comprising:
a heating unit;
a plurality of temperature sensors not in direct contact with any water inside the chamber body;
a proportional-integral-derivative (PID) controller; and
a control panel; and
a housing that houses the cooking chamber and the heating system,
wherein said PID controller uses a temperature correction algorithm that implements a temperature conversion factor so that the temperatures measured by the plurality of temperature sensors reflect actual water temperature in the chamber body, and wherein the heating system heats the chamber body and the PID controller controls the temperature using the plurality of temperature sensors and the heating unit, and wherein the plurality of temperature sensors are vertically spaced on the outside of the chamber body.

11. The sous-vide cooker of claim 1, wherein the housing comprises four side walls and air vents on an upper portion of one or more of the side walls, and wherein the side walls of the housing are spaced closely with sidewalls of the chamber body, so as to create a chimney effect to constantly vent hot air at a lower portion of the housing out through the vents.

12. The sous-vide cooker of claim 11, wherein the housing further comprising a base with a ventilated bottom plate.

13. The sous-vide cooker of claim 1, wherein the housing may have one or more transparent side walls or windows to allow viewing of food items that are located inside the chamber body.

14. The sous-vide cooker of claim 1, wherein the PID controller and the control panel are located in a thermally isolated control chamber to prevent overheating.

15. The sous-vide cooker of claim 1, wherein said PID controller is programmed to perform the following calibration functions:
- allowing three temperature settings to be entered: temperature setting A, temperature setting B, and temperature setting C;
- when the chamber body is filled with water, setting temperature setting A;
- when a reference thermometer measures water temperature in the chamber body to obtain a first measured temperature after setting temperature A is reached on a PID display, allowing the difference between the setting temperature A and the first measured temperature as adjustment value A to be entered;
- setting temperature setting B;
- when the reference thermometer measures water temperature in the chamber body to obtain a second measured temperature after setting temperature B is reached on the PID display, allowing the difference between the setting temperature B and the second measured temperature as adjustment value B to be entered;
- setting temperature setting C;
- when the reference thermometer measures water temperature in the chamber body to obtain a third measured temperature after setting temperature C is reached on the PID display, allowing the difference between the setting temperature C and the third measured temperature as adjustment value C to be entered; and
- storing, in memory, the adjustment values A, B and C.

16. The sous-vide cooker of claim 15, wherein a setting temperature is maintained by said PID controller which is programmed to perform the following functions:
- obtaining a measured temperature in the chamber body using the one or more temperature sensors;
- calculating the actual water temperature in the chamber body using a temperature offset subprogram using the stored adjustment value A, adjustment value B, and adjustment value C;
- calculating a difference $E_{(k)}$ between the setting temperature and the calculated actual temperature; and
- calculating a control value U(k) for the heating unit.

17. The sous-vide cooker of claim 16, wherein the PID controller contains a buzzer subprogram that provides an audio signal to the user if overheating is detected or if a set cooking time is reached.

18. A sous-vide cooker for use with water, comprising
a cooking chamber comprising:
- a chamber body having exterior surfaces and interior surfaces;
- a lid comprising an heat insulating layer and a heat reflective layer; and
- a water circulating plate located in the proximity of a bottom interior surface of the chamber body;

a heating system comprising:
- a heating unit that is in contact with the chamber body at a bottom exterior surface of the chamber body;
- one or more temperature sensors not in direct contact with any water inside the chamber body and positioned exteriorly to the chamber body;
- a proportional-integral-derivative (PID) controller; and
- a control panel;

a housing having a vented side wall; and
a base having a vented bottom plate,
wherein said PID controller uses a temperature correction algorithm that implements a temperature conversion factor so that the temperatures measured by the one or more temperature sensors reflect actual water temperature in the chamber body, wherein said PID controls the heating unit and causes the heating unit to heat the chamber body, and wherein when the chamber body is filled with water, the water is maintained at a set temperature with a variation from the set temperature that is equal to or less than 0.5° C.

19. The sous-vide cooker of claim 18, wherein the vented side wall comprises air vents at an upper portion of the side wall, and wherein the vented side wall of the housing is spaced closely with an exterior surface of the chamber body, so as to create a chimney effect to constantly vent hot air out through the air vents.

20. The sous-vide cooker of claim 18, wherein the PID controller and the control panel are located in a thermally isolated control chamber to prevent overheating.

* * * * *